(12) United States Patent
Koodli et al.

(10) Patent No.: US 7,995,533 B1
(45) Date of Patent: Aug. 9, 2011

(54) SYSTEM AND METHOD FOR EFFICIENT STATE TRANSFER IN MOBILE NETWORKS

(75) Inventors: Rajeev Koodli, Sunnyvale, CA (US); Charles E. Perkins, Saratoga, CA (US); Manish Tiwari, West Lafayette, IN (US)

(73) Assignee: Spyder Navigations L.L.C., Wilmington, DE (US)

( * ) Notice: Subject to any disclaimer, the term of this patent is extended or adjusted under 35 U.S.C. 154(b) by 3309 days.

(21) Appl. No.: 09/616,221

(22) Filed: Jul. 14, 2000

(51) Int. Cl.
*H04Q 7/00* (2006.01)
(52) U.S. Cl. ...................................... 370/331
(58) Field of Classification Search .............. 370/310, 370/331, 351, 389, 400; 709/227, 228, 230, 709/238, 249
See application file for complete search history.

(56) References Cited

U.S. PATENT DOCUMENTS

| | | | |
|---|---|---|---|
| 6,137,791 A * | 10/2000 | Frid et al. | 370/352 |
| 6,300,887 B1 * | 10/2001 | Le | 341/60 |
| 6,654,359 B1 * | 11/2003 | La Porta et al. | 370/328 |
| 6,711,147 B1 * | 3/2004 | Barnes et al. | 370/338 |
| 7,593,362 B1 * | 9/2009 | Casati et al. | 370/328 |

\* cited by examiner

*Primary Examiner* — Dmitry H Levitan

(57) ABSTRACT

A system and method for efficient state transfer in mobile networks provides improved performance by providing seamless transfer of updated reference state information across network access points during mobile node hand-off. This state transfer processing may be used in an Internet Protocol (IP) network and may include seamless transfer of header compression state.

19 Claims, 7 Drawing Sheets

SYSTEM AND METHOD FOR EFFICIENT STATE TRANSFER IN MOBILE NETWORKS

BACKGROUND OF THE INVENTION

Mobile communications networks, such as cellular networks, enable users to employ wireless devices for communication. These wireless devices, for example, cell phones and other mobile nodes, connect to the network via an access point such as a base station. Typically, the base station has a limited range within which it will be able to communicate with the mobile node. When a mobile node is physically taken beyond the range of its home base station, the mobile node must find a way to connect to another base station, or "hand-over", in order to retain communication with the network.

The process of transferring the mobile node's communication from one base station to another involves a process called a "hand-off" or "hand-over." This hand-off is typically performed by base stations and other wireless access points such as radio network controllers. During a hand-off process, some state information may be required to be transferred across network access points. As the number of mobile nodes on a network grows with the popularity of these devices, it becomes important to provide efficient support for transferring state information.

SUMMARY OF THE INVENTION

In order to improve the performance and scalability of a mobile network, a system and method is disclosed for improving processing of hand-offs and roaming by providing efficient state transfer. The state transfer processing may be used in an Internet Protocol (IP) based network and may include seamless transfer of header compression state, which is used as the example state in the rest of this document. In an embodiment of the present invention, efficient state transfer may provided by transferring updated reference state information, such as the header compression state, from one network element to another during hand-off so that the mobile node session may continue seamlessly.

DETAILED DESCRIPTION OF THE INVENTION

Figure 1:
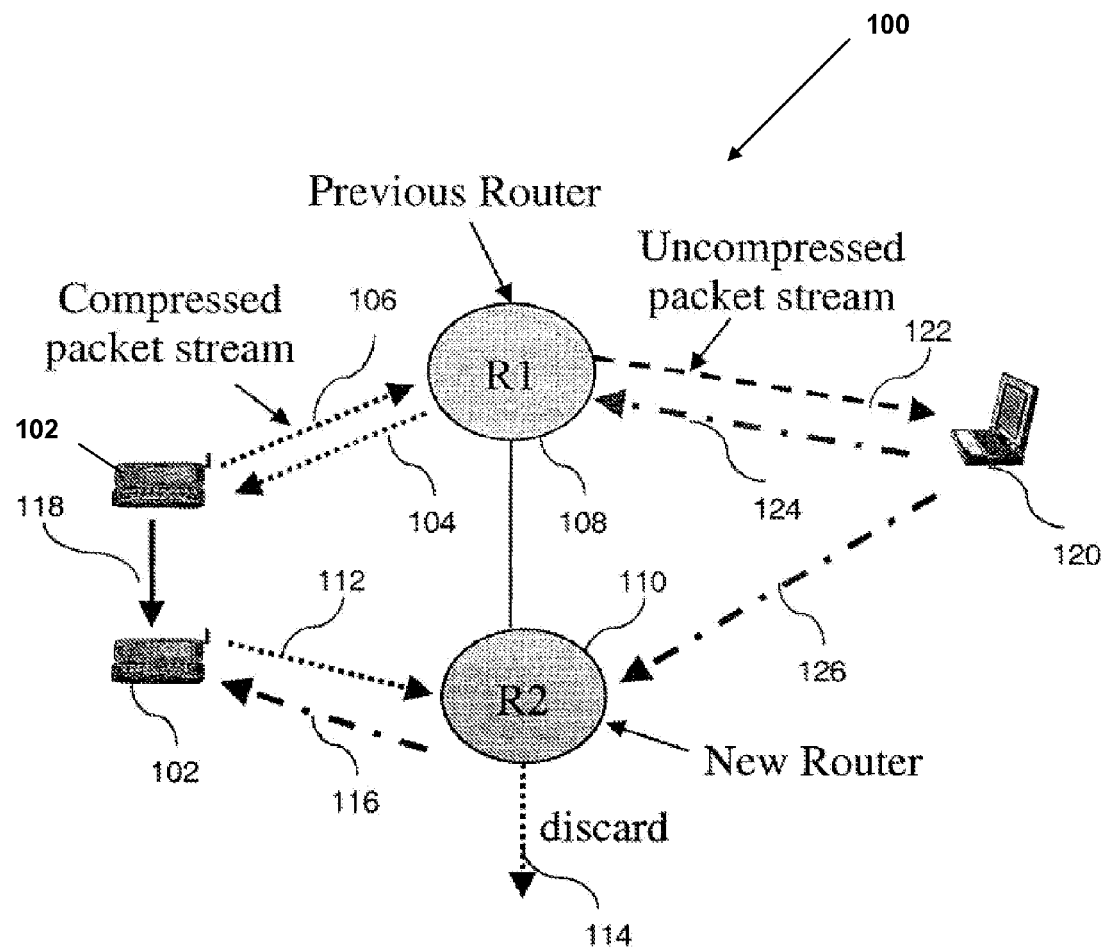
FIG. 1 is a diagram illustrating hand-off in an IP network.

An embodiment of the present invention provides a system and method that provides efficient state transfer that improves the performance of a mobile network. FIG. 1 is a diagram 100 showing operation of hand-off in a mobile network. Prior to hand-off, Mobile Node (MN) 102 maintains a compression state (not shown) for down-link packets, shown by arrow 104, and up-link packets, shown by arrow 106. MN 102 obtains this compression state from network element 108. Network element 108 is the point of attachment prior to hand-off. Network element 108 may be a router, a mobility agent such as a foreign agent, an IP point of attachment or any appropriate device that may be used for establishing connectivity in a communication network.

When MN 102 moves from one location to another location that is outside the range of network element 108, MN 102 needs to establish contact with another network element in order to maintain contact with a correspondent node 120. The location change of MN 102 is shown by arrow 118. The correspondent node 120 may be any device that can understand and communicate (transmit and receive) IP packets to a mobile unite 102. The correspondent node 120 may be, for example, another mobile unit, a computer, a Personal Digital Assistant (PDA), or any other device that is capable of communicating with an IP network.

During hand-off, MN 102 establishes contact with network element 110. In order for the hand-off to occur with seamless operation, network element 110 should have the appropriate compression state. If network element 110 does not possess the appropriate compression state, packets may be discarded in the up-link, and uncompressed packets may be transmitted in the down-link. For example, packets in the up-link, shown by arrow 112, may be discarded from network element 110, as shown by arrow 114. Also, uncompressed packets may be transmitted in the down-link, as shown by arrow 116.

In an embodiment of the present invention, seamless header compression operation during hand-off may be maintained. Header compression, in general, may be achieved by transmitting only portions of the IP packet header that are required (according to the definition of the particular compression algorithm used) at any particular transmission epoch. Header types that may be used in connection with an embodiment of the present invention include the following: Full Headers, Partial Headers, and Minimal Headers. A Full Header contains the complete header as defined by the particular protocol used. An embodiment of the present invention may be implemented to take advantage of a wide variety of protocols including transport protocols, such as TCP, Internet Protocol (IP), Real-time Transport Protocol (RTP), UDP, and application protocols such as http. A Partial Header includes less than the contents of a Full Header, for example, in an embodiment of the present invention, the Partial Header includes only the changing fields of the header. Static fields are kept out of the partial header.

A Minimal Header may be defined to represent the most desired state for optimum efficiency. In an embodiment of the present invention, the Minimal Header may be restricted to fields that are necessary for the operation of the header compression algorithm. The changing fields that are included in the Minimal Header may be represented such that they may not be needed depending on the operating state of the compression algorithm being used. Similarly as for Partial Headers, static fields may be excluded from the Minimal Header.

Figure 5:
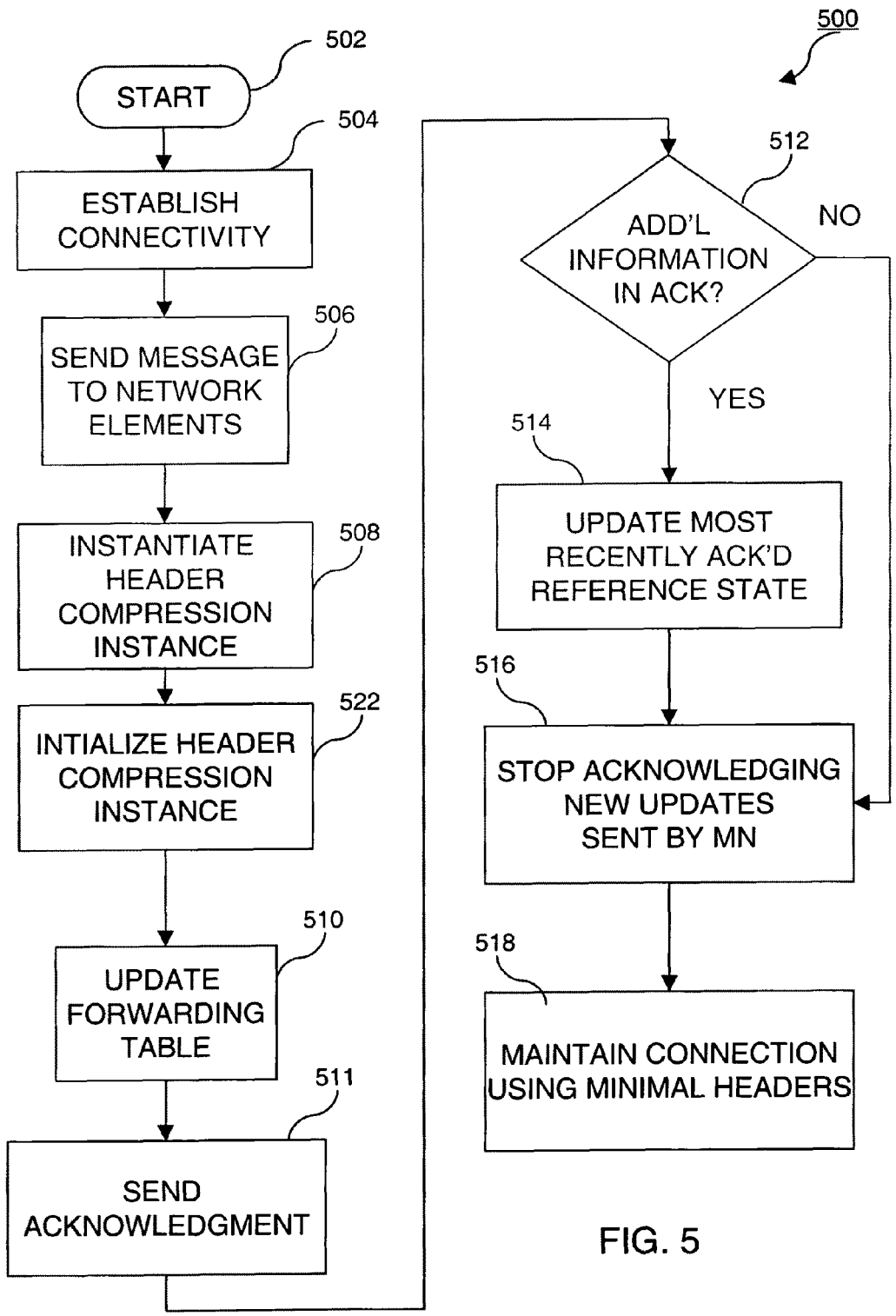
FIG. 5 is a flowchart illustrating steps that may be performed in a method for providing efficient state transfer in a mobile network in accordance with an embodiment of the present invention.
Figure 6:
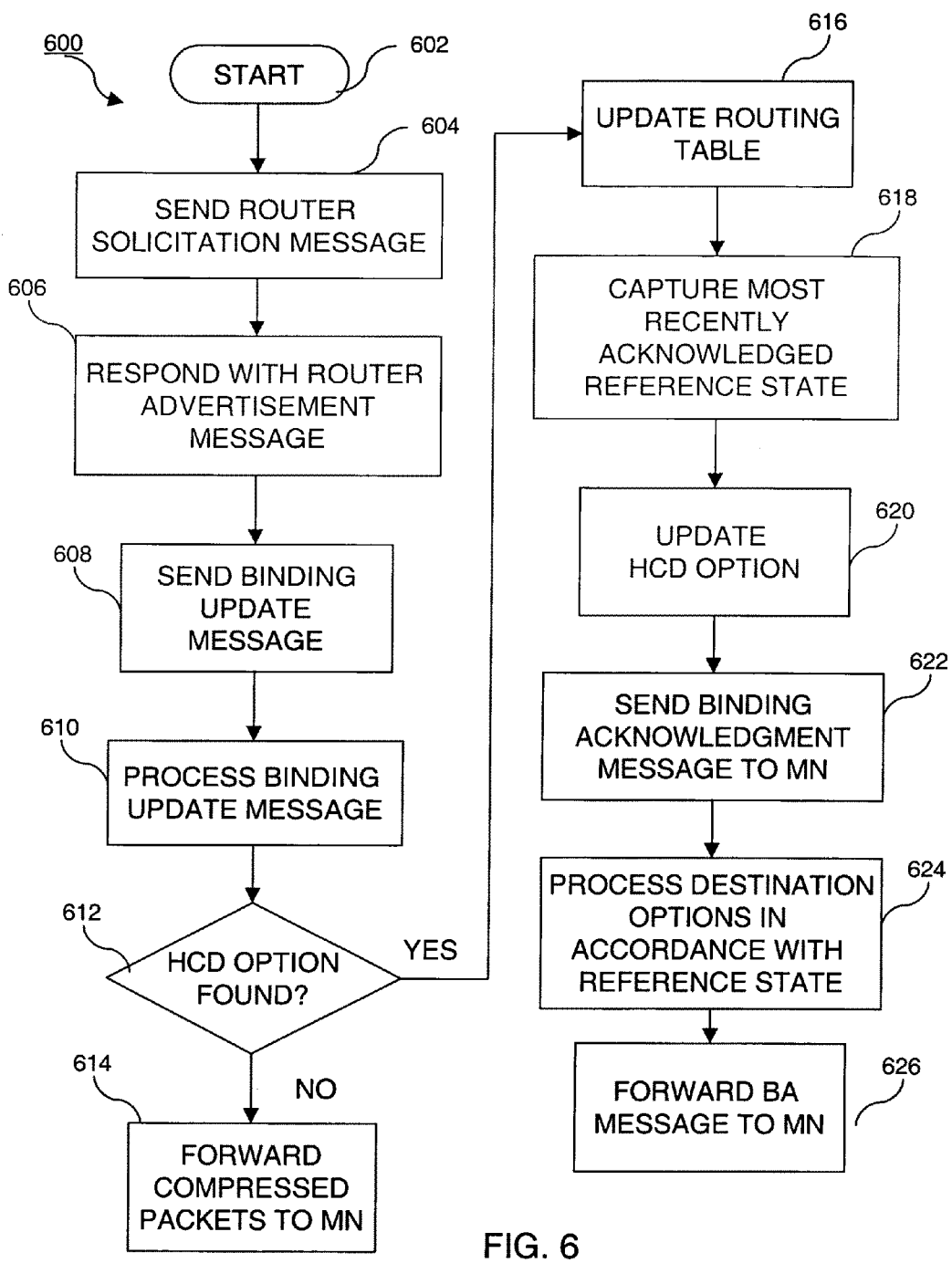
FIG. 6 is a flowchart illustrating steps that may be performed in a method for header compression processing in accordance with an embodiment of the present invention.

In FIG. 5, a flowchart 500 illustrating steps that may be performed when a mobile node undergoes hand-off. The method begins, 502, where MN exchanges communication with a network element 110 (Next Router) which is different from the network element 108 (Previous Router) that the MN was connected to prior to hand-off. MN communicates with next router 110 in order to establish IP connectivity with it, step 504. After establishing connectivity but prior to resuming connections with its correspondents, MN sends a message, step 506, to Previous Router (PR) 108 and Next Router (NR) 110. In response, Next Router 110 initializes a header compression state and indicates to Previous Router 108 that it should provide Next Router 110 with necessary state information. This message may be made secure by the use of appropriate authentication information between MN 102, Next Router 110 and Previous Router 108. Also, MN 102 may optionally supply a portion of the state information necessary for initialization of Next Router 110.

In response to the messages given by MN 102, Next Router 110 instantiates a header compression instance, step 508. Next Router 110 then initializes the header compression instance with state information probed by MN 102, step 522. Previous Router 108 updates its forwarding table, step 510, in order to ensure that packets that are sent to the MN 102 through its previous Care-of-Address (CoA) are sent tunneled to Next Router 110. Previous Router 108 then sends an acknowledgment message (ACK) back to MN via Next Router 110, step 511.

Optionally, the acknowledgment message may contain additional information that Next Router 110 may use in addition to acknowledging the message from MN 102. For example, to achieve an optimum state, this additional information may be a most recently acknowledged header compression state sent from Previous Router 108 to Next Router 110. If such additional information is to be included in the acknowledgment message, a check for that information may optionally be performed, step 512. Step 512 may be omitted if such additional information will not be processed or if such additional information is to be processed in the method's default operating mode. If additional information is found in step 512, then the additional information is updated in the acknowledgment message, step 514. For example, Previous Router 108 may send a most recently acknowledged header compression state to Next Router 110. After sending this state, Previous Router 108 stops acknowledging any potential new updates to the header compression state that MN 102 might send, step 516. (For example, MN 102 is still connected to Previous Router 108 at this point, as might occur during a soft hand-off.) This allows New Router 108 to avoid having to start compression from the beginning with full headers. For example, MN 102 may start sending compressed packets as if MN 102 were still attached to Previous Router 108. If the state does not warrant sending a new update, then MN 102 may continue to send minimal state information, step 518, to Next Router 110, resulting in seamless header compression even during hand-off. If state changes occur subsequent to hand-off, MN 102 continues to send updates until it receives positive acknowledgment from Previous Router 108. A desirable effect of including most recently acknowledged header compression state information in the acknowledgment message is that it allows Next Router 110 to achieve optimal compression without having to start the compression from the beginning by using full headers. (See description of full headers above.) By allowing the Next Router 110 to begin post-hand-off operation by using partial headers or compressed headers rather than full headers, the Next Router 110 effectively acts as if it were the Previous Router 108 in that it already has an amount of state information available to it. This scenario allows MN 102 to continue sending minimal state information to Next Router 110, thus improving the efficiency of state transfer at hand-off.

Figure 7:
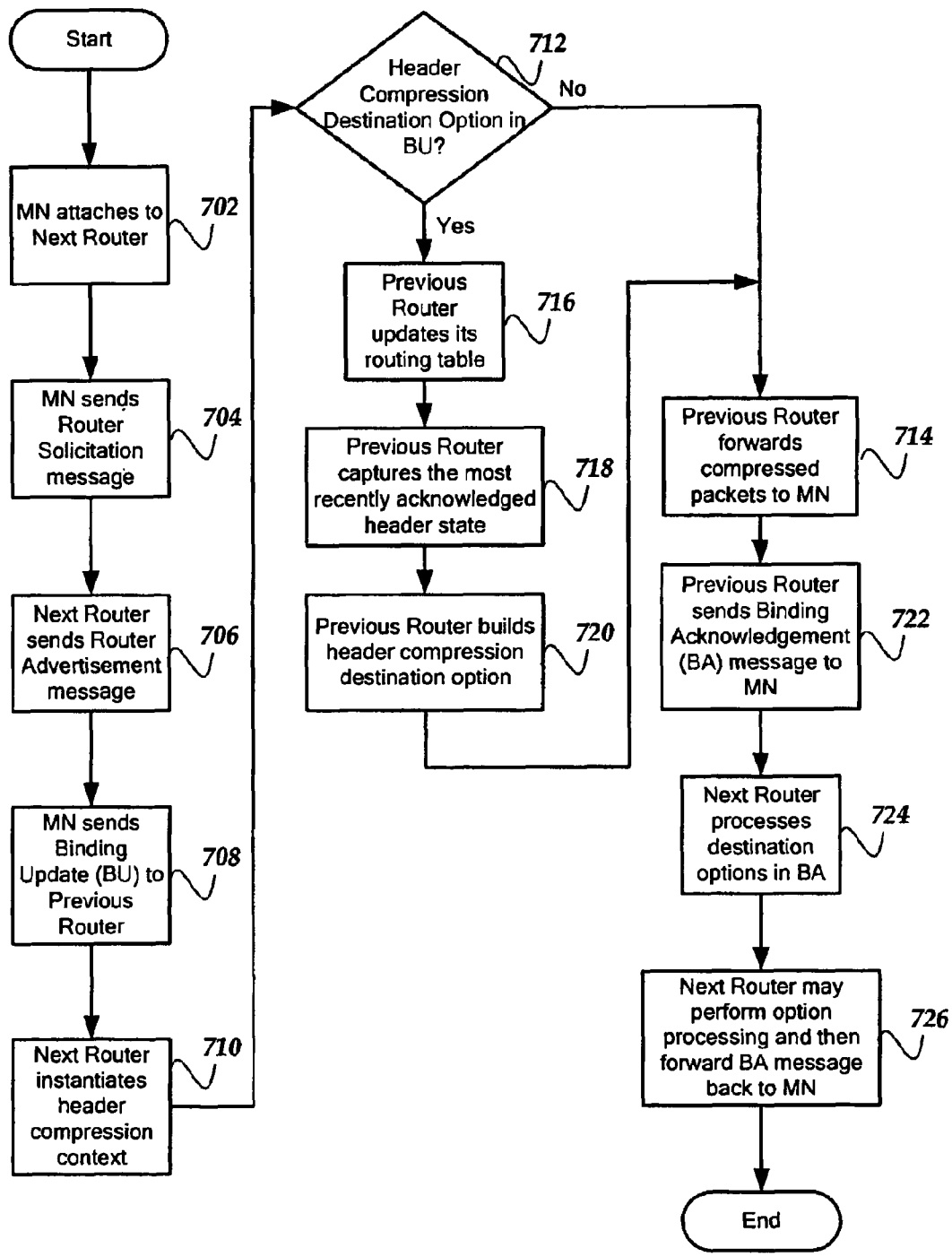
FIG. 7 is a flowchart illustrating steps that may be performed by a system for providing efficient state transfer in a mobile IP network in accordance with an embodiment of the present invention.

In FIG. 7, a flowchart 700 illustrates an example of an embodiment of the present invention, showing a method for providing efficient state transfer that may be performed in a mobile network using Mobile IP version 6. The method shown in flowchart 700 may also be performed using Mobile IP version 4 as well. In a Mobile IP version 4 implementation, the network elements may replaced by special mobile nodes called foreign agents, and the signaling messages that are used are compatible with Mobile IP version 4. The method begins, 702, when MN 102 attaches itself to Next Router 110. In step 704, the IP layer in MN 102 sends a Router Solicitation message. Next Router 110 responds with a Router Advertisement message, step 706. The Router Advertisement message may be enhanced to include a capability bit mask that indicates header compression capability. For example, a "C" bit may be defined in the Reserved field of the Router Advertisement message.

MN 102 then sends Binding Update (BU), for example a MIPv6 Binding Update to Previous Router (R1) 108 with a routing header pointing to Next Router (R2) 110. The BU may include destination options for Previous Router 108 and Next Router 110. For example, destination options may include indication and means for header compression state initialization at Next Router 110, and a request for Previous Router 108 to transfer the state. Other destination options may include, for example, delivery of buffered packets and delivery of Quality of Service (QoS) state. These destination options may be enumerated in the BU message. The BU message may be secured by appropriate security associations among MN 102, Previous Router 108, and Next Router 110. The purpose of these features is to allow for a "smooth hand-over" to take place from one router to another.

Next Router 110 processes the BU message in step 710. In response to the BU message, Next Router 110 instantiates a header compression context for each Context Identifier (CID) supplied by MN 102. Next Router 110 also associates the supplied with each CID. The supplied filter identifies the packet stream. For example, the filter may identify an IP flow undergoing compression, and may include the IP addresses of MN 102, CN 202, and corresponding port numbers (not shown). After instantiating the header compression context, Next Router 110 forwards the message to Previous Router 108.

If Previous Router 108 finds a header compression destination (HDC) option in the BU message in step 712, Previous Router 108 updates its routing table, step 716, so that packets that are destined to the previous CoA of MN 102 and require header compression are tunneled to Next Router 110. For each CID that is enumerated in the destination option, Previous Router 108 captures the most recently acknowledged header state, step 718, and builds a header compression destination option, step 720. The most recently acknowledged header state may include both the up-link and down-link states. This transfer of reference state provides improved compression efficiency in spite of hand-over, but it expects the compression algorithm to behave in a certain way. If knowledge about the specific operation of the compression algorithm is not available, then Previous Router 108 indicates to Next Router 110 that it will tunnel compressed packets to Next Router 110. Next Router 110 then forwards the compressed packets to MN 102, step 714. Previous Router 108 may perform similar operations for other options, for example, QoS state transfer, that are enumerated in the BU message. If Previous Router 108 does not find a header compression destination option in the BU message in step 712, then Previous Router 108 simply forwards the compressed packets on to MN 102, step 714 for further processing.

Figure 2:
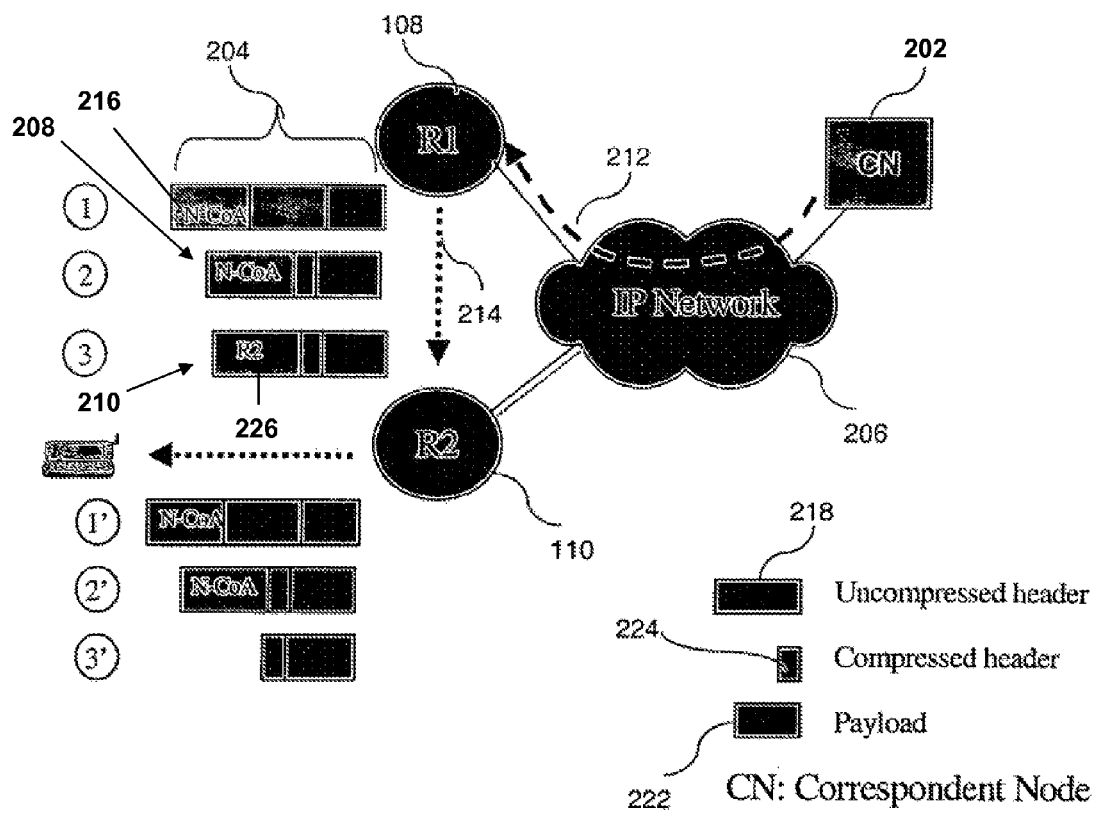
FIG. 2 is a diagram illustrating a system for efficient state transfer in a mobile network in an embodiment of the present invention.
Figure 3:
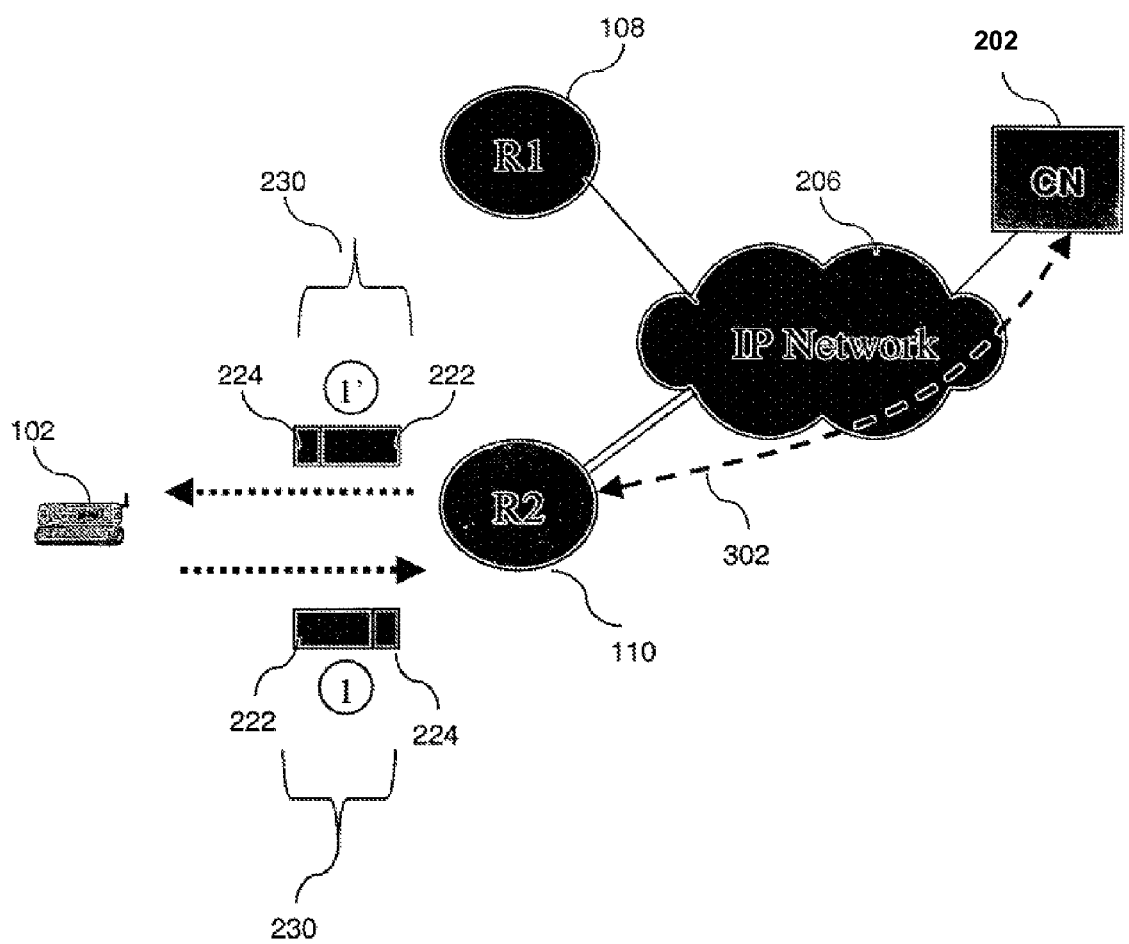
FIG. 3 is a diagram illustrating a system for efficient state transfer in a mobile network in an embodiment of the present invention.
Figure 4:
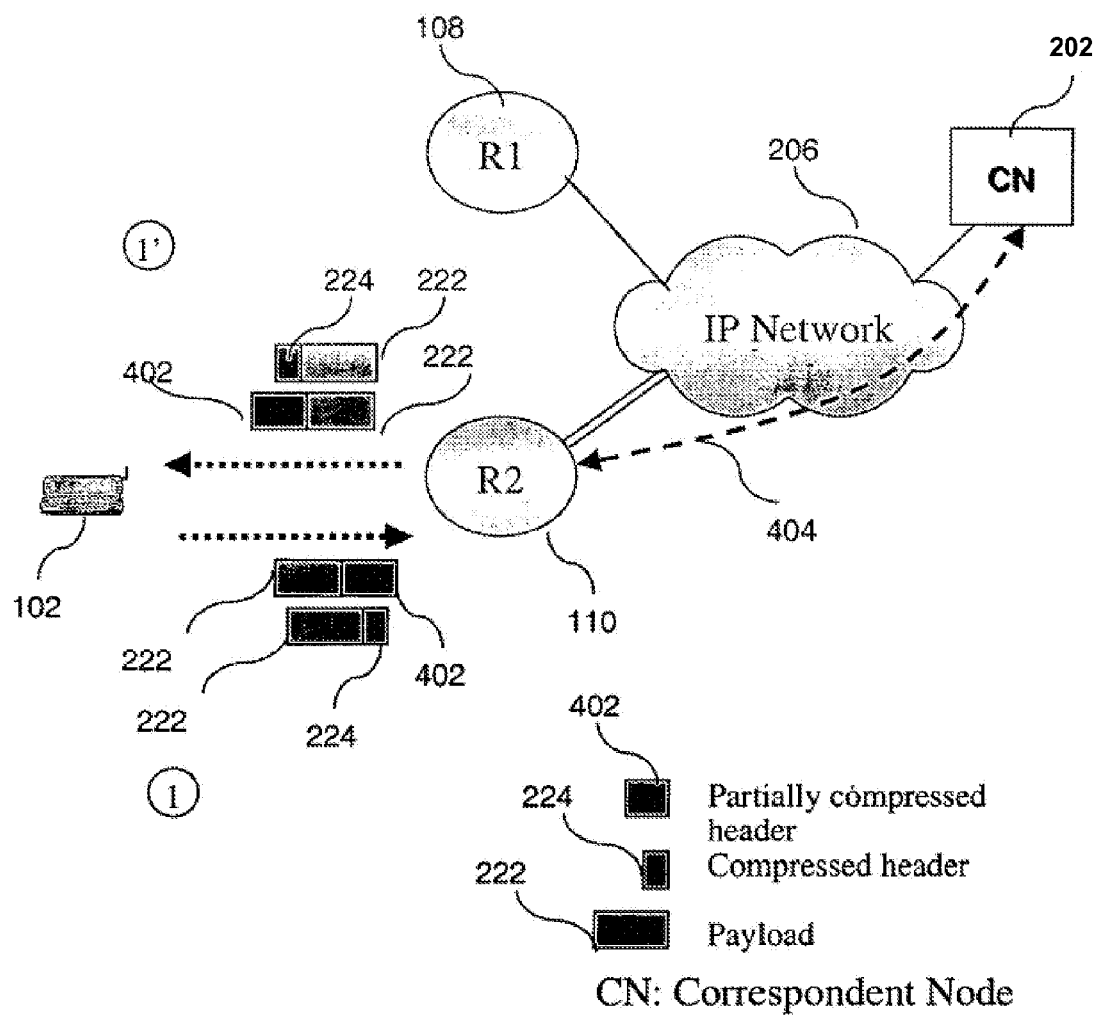
FIG. 4 is a diagram illustrating a system for efficient state transfer in a mobile network in an embodiment of the present invention.

If MN 102 is still in contact with Previous Router 108, for example, in a soft hand-over scenario, Previous Router 108 may stop acknowledging any new updates to the reference state. Eventually, Previous Router 108 sends a Binding Acknowledgment (BA) message to MN 102, step 722, along with a routing header pointing to Next Router 110 and associated destination options, if available. In step 724, Next Router 110 processes the destination options in the BA message, and if the header compression option has been selected or included, Next Router 110 may use the state provided in the option to initialize each of the header compression instances instantiated during the BU message. Next Router 110 may also perform option processing related to other options enumerated in the destination options, and then forward the BA message back to MN 102, step 726. The BA message is an acknowledgment to the BU message. After receiving the BA message, MN 102 may send BU messages to its CNs 202. The result of this process illustrated in FIG. 7 is the establishment of state at Next Router 110 for header compression purposes. FIGS. 2-4 illustrate what happens for user-plane packets sent to and from MN 102.

In FIG. 2, correspondent node CN 202 sends uncompressed packet 204, as shown by arrow 212, to R1 108 via network 206. Uncompressed packet 204 may be part of a stream of uncompressed packets and may include packets that are destined for the previous Care of Address (CoA) (not shown) of MN 102. Uncompressed packet 204 may include a new CoA 216, an uncompressed header 218, and a payload 222. R1 108 receives uncompressed packet 204 and compresses it. R1 108 then tunnels compressed packet to R2 110, as shown by arrow 214. Compressed packet 208 may be one of a stream of packets that are tunneled from R1 108 to R2 110, and may include a new CoA 216, a compressed header 224, and a payload 222.

Upon receiving compressed packet 208, R2 110 determines whether compressed packet 208 contains further updates to the reference state (not shown) that R2 110 has a result of result of receiving Binding Acknowledgement (BA) message discussed above. R2 110 may use the Context Identifier (CID) or other appropriate methods to verify if compressed packet 208 contains further reference state updates. If compressed packet 208 contains a reference state update, then R2 110 updates the reference state and forwards an updated compressed packet 210 to MN 102, as shown by arrow 216. Updated compressed packet 210 may include a payload 222, a compressed header 224, and an updated reference state 226.

Otherwise, if compressed packet 208 does not contain updates to the reference state, R2 110 may use CID (not shown) to determine an appropriate interface for sending the compressed packet 208. R2 110 then simply forwards compressed packet 208 to MN 102 in accordance with an appropriate interface.

Under the examples given above, MN 102 may receive from R2 110 a compressed packet 208 that is not updated or a compressed packet 210 that has been updated with a recently acknowledged reference state. In both cases, MN 102 may decompress the headers in the packet stream that it receives by using its maintained reference state. In an embodiment of the present invention, in cases where an updated compressed packet 210 is sent to MN 102, R2 110 may be implemented to optionally accept acknowledgments from MN 102 regarding new updates to the reference state.

In both FIG. 3 and FIG. 4, R1 108 has sent a most recently acknowledged state to R2 110, and has stopped acknowledging any new updates to the reference state from MN 102, in accordance with step 518 in FIG. 5 described above. As a result of having the most recently acknowledged reference state, R2 110 may correctly perform decompression of compressed packets received from MN 102.

In FIG. 3, if the reference state at MN 102 changes after R1 108 has stopped acknowledging new updates to the reference state, MN 102 will continue to send the updated reference state until it receives a positive acknowledgment message from the decompressor (not shown). The decompressor resides at R2 110 in the example depicted by FIG. 3. R2 110 may use the updates from MN 102 to correctly decompress headers 224. However, if the reference state does not change at MN 102 after step 518 of FIG. 5 above, then MN 102 continues to send header fields as differences with respect to the previously acknowledged reference state, which R2 110 possesses, so R2 110 may continue to decompress the headers.

FIG. 4 illustrates a scenario where R2 110 does not possess the reference state as a result of steps 710-724 of FIG. 7. For example, where a generic compression algorithm is used, R2 110 discards the compressed packets and sends a negative acknowledgment back to MN 102 requesting it to send a full header 218 or a partial header 402. Partial header 402 may be, for example, a RTP or TCP full header with a new CoA. The compressor (not shown) at R2 110 and MN 102 then resynchronize with each other eventually. Note that MN 102 is likely to send a full header 218 in a general-purpose compressor as a result of a change in the CoA of MN 102 due to hand-off.

When R2 110 receives uncompressed packets from a correspondent node (CN) 202 associated with MN 102, the behavior is similar to above. If R2 110 has the correct reference state as a result of steps 710-724 of FIG. 7, then R2 110 may compress packets and benefit from optimum compression efficiency, as shown in FIG. 3. If MN 102 does not possess the required reference state, R2 110 may still use the compression instance instantiated in steps 708 in FIG. 7 above and send full headers 218 or partial headers 402 to MN 102, as shown in FIG. 4. The compression instance instantiated in step 708 in FIG. 7 correctly associates incoming packets with an appropriate CID. This correct association is important in providing a seamless operation of the compression mechanism.

What is claimed is:

1. A method comprising:
    establishing a first connection between a first network element and a mobile node;
    establishing a second connection between the first network element and a second network element in response to a handoff request from the mobile node;
    requesting, by the first network element, header compression state information from the second network element;
    receiving, at the first network element, the requested header compression state information from the second network element; and
    receiving, at the first network element via the first connection, a portion of the header compression state information from the mobile node.

2. The method of claim 1, wherein the handoff request is a handoff request from the first network element to the second network element.

3. The method of claim 1, further comprising forwarding, by the first network element, a message from the second network element to the mobile node, wherein the message indicates a most recently acknowledged header compression state sent from the second network element to the first network element.

4. The method of claim 1, further comprising receiving messages from the mobile node, wherein the messages are compressed according to the received header compression state information.

5. A method comprising:
sending a router solicitation message from a mobile node to a first router;
receiving a router advertisement message from the first router at the mobile node in response to the router solicitation message, wherein the router advertisement message includes a header compression capability option;
sending a binding update message from the mobile node to a second router, wherein the binding update message includes a routing header pointing to the first router and at least one destination option; and
receiving a binding acknowledgment message from the second router at the mobile node, wherein the binding acknowledgment message includes a routing header pointing to the first router.

6. The method of claim 5, wherein the at least one destination option comprises a header compression destination option.

7. A non-transitory tangible computer-readable medium having instructions stored thereon, the instructions comprising:
establishing a first connection with a mobile node;
establishing a second connection with a network element in response to a handoff request from the mobile node;
requesting header compression state information from the network element;
receiving the requested header compression state information from the network element; and
receiving, via the first connection, a portion of the header compression state information from the mobile node.

8. A non-transitory tangible computer-readable medium having instructions stored thereon, the instructions comprising:
sending a router solicitation message to a first router;
receiving a router advertisement message from the first router in response to the router solicitation message, wherein the router advertisement message includes a header compression capability option;
sending a binding update message to a second router, wherein the binding update message includes a routing header pointing to the first router and at least one destination option; and
receiving a binding acknowledgment message from the second router, wherein the binding acknowledgment message includes a routing header pointing to the first router.

9. A method comprising:
initiating, by a mobile node, a handoff procedure to a first network element from a second network element;
establishing a connection between the mobile node and the first network element;
sending at least a portion of header compression state information from the mobile node to the first network element as part of the handoff procedure; and
receiving, at the mobile node, a most recently acknowledged header compression state from the second network element.

10. The method of claim 9, wherein the header compression state information comprises the most recently acknowledged header compression state received by the second network element.

11. The method of claim 9, further comprising, after the sending at least a portion of header compression state information, sending compressed packets from the mobile node to the first network element according to the header compression state information.

12. The method of claim 11, wherein the compressed packets comprise partial or compressed headers.

13. A non-transitory tangible computer-readable medium having instructions stored thereon, the instructions comprising:
initiating, by a mobile node, a handoff procedure to a first network element from a second network element;
establishing a connection between the mobile node and the first network element;
sending at least a portion of header compression state information from the mobile node to the first network element as part of the handoff procedure; and
receiving, at the mobile node, a most recently acknowledged header compression state from the second network element.

14. A method comprising:
receiving a router solicitation message from a mobile node at a first network element;
sending a router advertisement message from the first network element to the mobile node in response to the router solicitation message, wherein the router advertisement message includes a header compression capability option;
receiving a binding acknowledgment message at the first network element from a second network element, wherein the binding acknowledgment message includes header compression state information utilized by the second network element.

15. The method of claim 14, wherein the at least one destination option comprises a header compression destination option.

16. The method of claim 14, wherein the header compression state information includes a most recently acknowledged header state from the second network element.

17. The method of claim 16, wherein the most recently acknowledged header state includes both up-link and down-link states.

18. The method of claim 14, further comprising forwarding the binding acknowledgement message from the first network element to the mobile node.

19. A non-transitory tangible computer-readable medium having instructions stored thereon, the instructions comprising:
receiving a router solicitation message from a mobile node;
sending a router advertisement message to the mobile node in response to the router solicitation message, wherein the router advertisement message includes a header compression capability option;
receiving a binding acknowledgment message from a network element, wherein the binding acknowledgment message includes header compression state information utilized by the network element.

* * * * *